(12) United States Patent　　　　　(10) Patent No.:　US 12,667,044 B2
Colchado　　　　　　　　　　　　　　(45) Date of Patent:　Jun. 30, 2026

(54) COMMERCIAL LAWN MOWER OUTLET COVER

(71) Applicant: Jose Colchado, Houston, TX (US)

(72) Inventor: Jose Colchado, Houston, TX (US)

( * ) Notice: Subject to any disclaimer, the term of this patent is extended or adjusted under 35 U.S.C. 154(b) by 346 days.

(21) Appl. No.: 18/428,757

(22) Filed: Jan. 31, 2024

(65) Prior Publication Data

US 2025/0241236 A1　　Jul. 31, 2025

(51) Int. Cl.
*A01D 34/00*　　　　(2006.01)

(52) U.S. Cl.
CPC ................................. *A01D 34/005* (2013.01)

(58) Field of Classification Search
CPC .. A01D 2101/00; A01D 34/00; A01D 34/001; A01D 34/81; A01D 34/82; A01D 34/005
See application file for complete search history.

(56) References Cited

U.S. PATENT DOCUMENTS

| | | | |
|---|---|---|---|
| 4,189,904 | A | 2/1980 | Paker |
| 4,864,808 | A | 9/1989 | Weber |
| 5,048,279 | A * | 9/1991 | Badawey ............. A01D 34/005 56/255 |
| 5,491,964 | A * | 2/1996 | Butler .................. A01D 42/005 D15/15 |
| 5,826,417 | A * | 10/1998 | Evans .................. A01D 34/828 56/320.2 |
| 6,854,253 | B2 * | 2/2005 | Dickey ................ A01D 42/005 56/320.2 |
| 7,406,817 | B2 * | 8/2008 | Bledsoe ............... A01D 42/005 56/320.2 |
| 7,448,195 | B2 * | 11/2008 | Kohler .................. A01D 34/82 56/320.2 |
| 7,526,909 | B1 * | 5/2009 | Procter ................ A01D 42/005 56/320.2 |
| D700,630 | S * | 3/2014 | Davis ............................ D15/17 |
| 10,045,481 | B2 * | 8/2018 | Chase .................... A01D 34/71 |
| 11,483,973 | B1 * | 11/2022 | Pernice ............... A01D 42/005 |
| 12,527,253 | B2 * | 1/2026 | Geary .................. A01D 34/667 |
| 2003/0000195 | A1 | 1/2003 | Watkins |
| 2004/0112031 | A1 * | 6/2004 | Dickey ............... A01D 42/005 56/320.2 |
| 2007/0261380 | A1 * | 11/2007 | Bledsoe ............... A01D 42/005 56/320.2 |
| 2008/0000211 | A1 * | 1/2008 | Hafendorfer .......... A01D 34/82 56/320.2 |
| 2008/0134654 | A1 * | 6/2008 | Kohler .................. A01D 34/71 56/320.2 |
| 2008/0250768 | A1 * | 10/2008 | Butler .................. A01D 34/005 56/320.1 |
| 2014/0260160 | A1 * | 9/2014 | Baker .................. A01D 34/005 56/16.8 |

FOREIGN PATENT DOCUMENTS

CA　　　1289752　　　9/1987

* cited by examiner

*Primary Examiner* — Adam J Behrens

(57) ABSTRACT

A commercial lawn mower outlet cover is used for covering a grass outlet opening to permit mulching of grass and/or leaves that generally includes a cover plate and a bracket structure. The outlet cover may be suspended from a vertical flange on the lawn mower deck to permit easy connection and disconnection to permit easy switching between mulching and regular cutting.

10 Claims, 7 Drawing Sheets

COMMERCIAL LAWN MOWER OUTLET COVER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lawn mowers and more particularly pertains to a new commercial lawn mower outlet cover for covering a grass outlet to permit mulching of grass and/or leaves. For convenience, only grass will be discussed herein, although this disclosure relates to cutting any lawn debris or objects, including grass, leaves, weeds, and any other such objects. Commercial lawn mowers usually are designed with a grass outlet opening in the deck. Above this grass outlet opening is usually a vertical flange for guiding the mounting of mowing accessories, such as guide chutes, bagging structures, or even covering structures for mulching. Such accessories are usually connected in a pivotable fashion to a pair of mounting posts. The accessories can often be attached by screwing or clipping onto the mounting posts. While not a particularly challenging procedure, such changes take time and require the user to interrupt a mowing procedure for extended period of time. These stoppages cost the user in time and thus money, especially if the user is working on a property that requires multiple changes between regular cutting and mulching. In addition, even though the changes may not be overly difficult, they do require some skill and attention, which inexperienced users may not possess. Therefore, it would be advantageous to have a mulching cover that can be easily connected and disconnected with minimal effort and skill, and which is relatively inexpensive and durable.

(2) Description of Related Art Including Information Disclosed Under 37 CFR 1.97 and 1.98

The prior art relates to lawn mowers and lawn mower accessories. The prior art, as best understood, generally discloses mulching covers that are permanently attached to the deck of the lawn mower, some of which require modification of the mower itself from its original design. Some mulching covers are rather complex and thus expensive. Other mulching covers require a relatively time-consuming attachment procedure. The prior art, as best understood, does not disclose a mulching cover that can be easily connected to and disconnected from an unmodified lawnmower deck.

BRIEF SUMMARY OF THE INVENTION

An embodiment of the disclosure meets the needs presented above in a commercial lawn mower outlet cover for covering a grass outlet opening to permit mulching of grass and/or leaves that generally includes a cover plate and a bracket structure. The cover plate is rectangular and having a length and width sufficient to cover a grass outlet opening in a deck of a commercial lawn mower. The bracket structure is designed to removably connect the cover plate to a deck flange positioned above the grass outlet opening and projecting vertically from the deck of the commercial lawn mower. The bracket structure is L-shaped and includes a plate portion having a height and a length sufficient to cover a substantial portion of the deck flange. The bracket structure includes a connecting leg positioned essentially perpendicular to and to connect each of the cover plate. The connecting leg has a width sufficient to space the cover plate and the plate portion apart from one another to create a receiving space sufficient to receive the deck flange therein. The connecting leg is designed and positioned to rest on a top edge of the deck flange upon installation. The bracket structure has a length such that the sides of the bracket structure are positioned close or immediately adjacent to a pair of discharge chute mounting posts behind the deck flange and projecting vertically from the deck of the commercial lawn mower such that the discharge chute mounting posts resist sliding movement of the commercial lawn mower outlet cover on the deck flange. The height of the bracket structure is sufficient to maintain engagement with the deck flange upon unintentional slight or moderate vertical displacement of the commercial lawn mower outlet cover by impact with outdoor objects or jostling due to vibrational forces. The bracket structure is designed and positioned to freely suspend the cover plate from the deck flange such that the cover plate can be easily lowered or dropped downwardly into a blocking position to cover the grass outlet opening to permit mulching of grass and/or leaves and can be easily lifted upwardly and off of the deck flange to permit ejecting of cut grass and/or leaves out of the grass outlet opening.

In accordance with at least one possible embodiment, the bracket structure includes a first bracket structure. The commercial lawn mower outlet cover further includes a second bracket structure designed similar to the first bracket structure. The second bracket structure is positioned adjacent and spaced apart from the first bracket structure to form a guide slot therebetween. The guide slot is designed to be slid around one of the pair of discharge chute mounting posts to guide and properly position the commercial lawn mower outlet cover during installation and further resist sliding movement on the deck flange.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
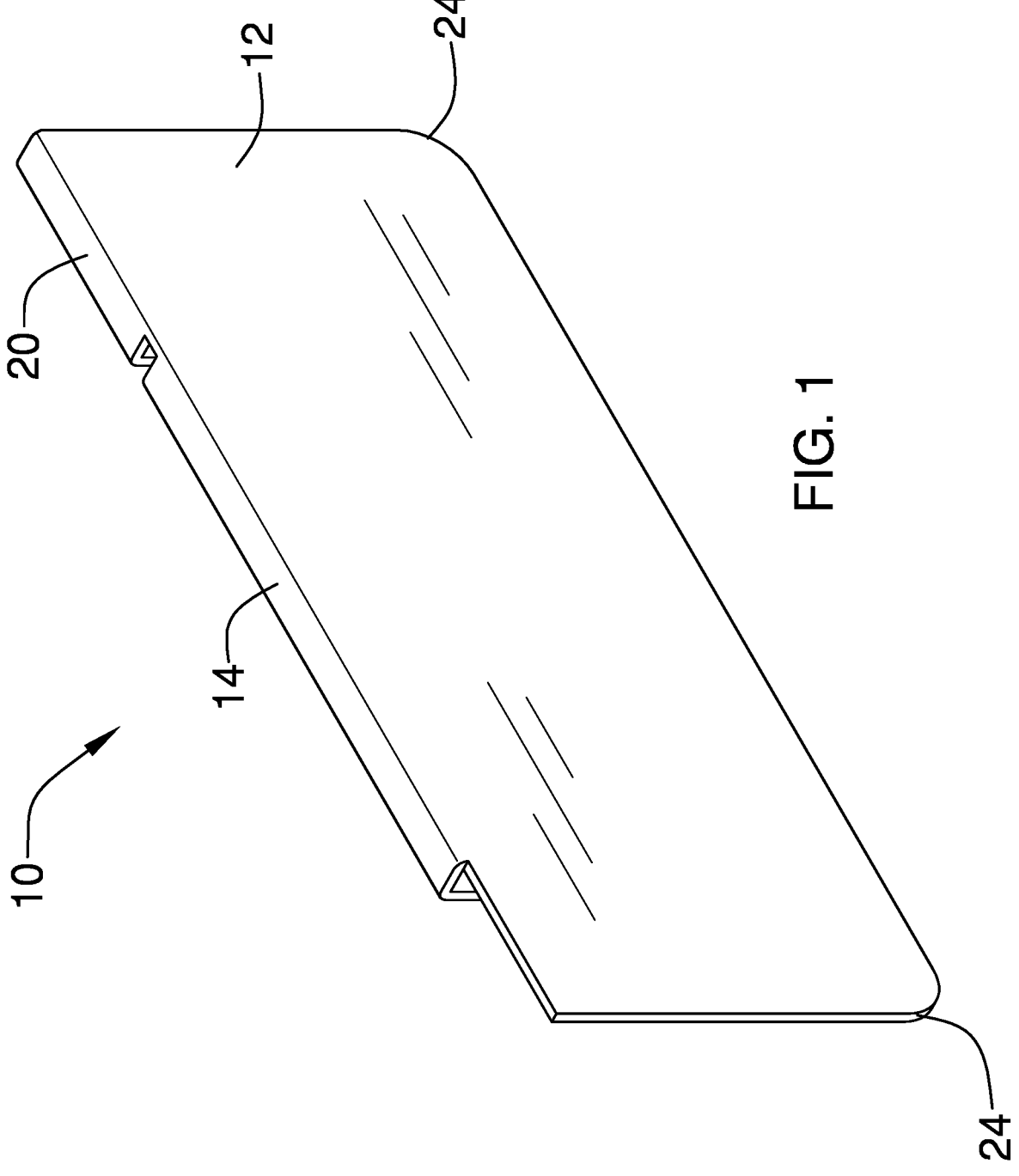
FIG. 1 is a front perspective view of a commercial lawn mower outlet cover according to an embodiment of the disclosure.
Figure 2:
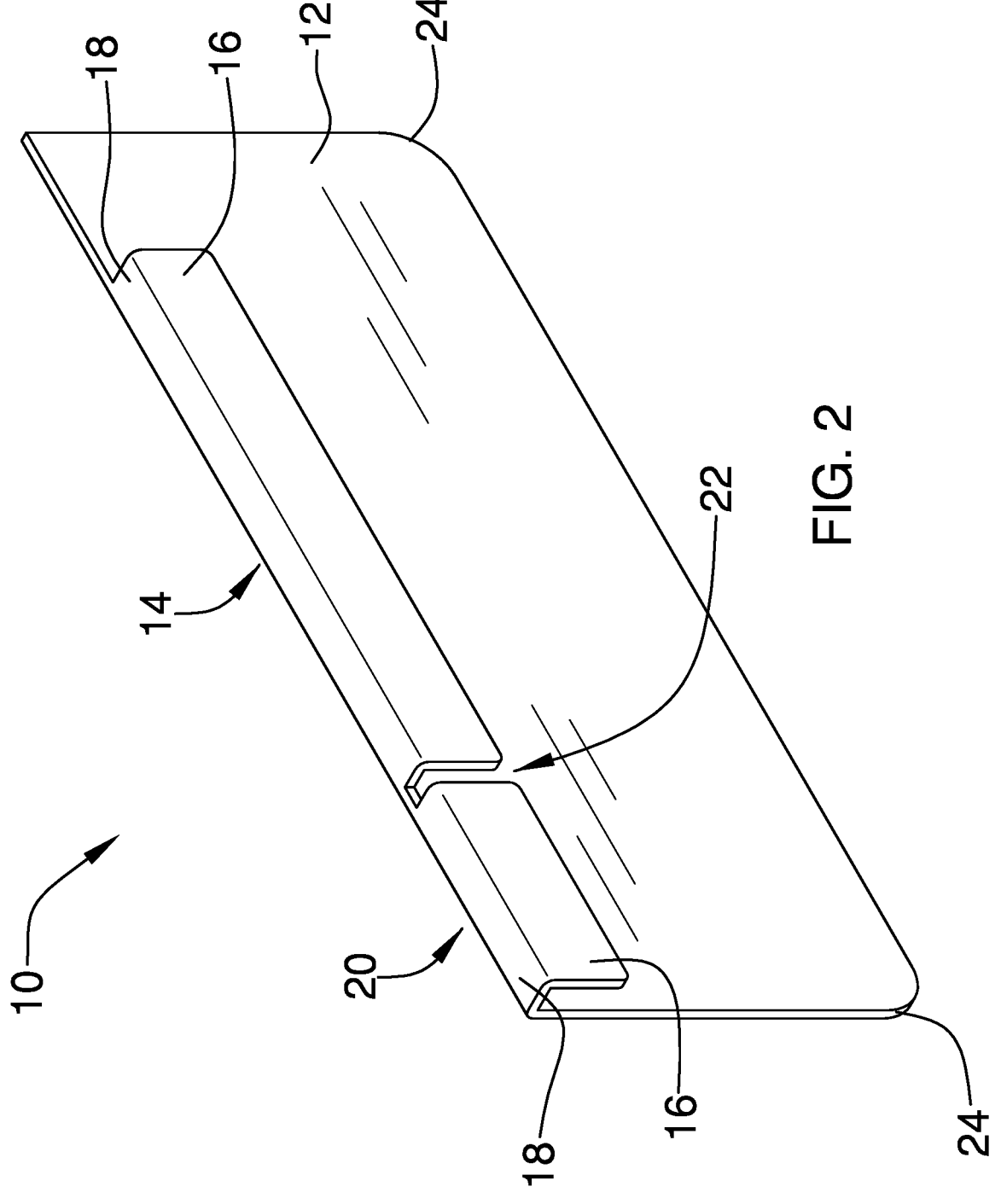
FIG. 2 is a rear perspective view of an embodiment of the disclosure.
Figures 3, 4:
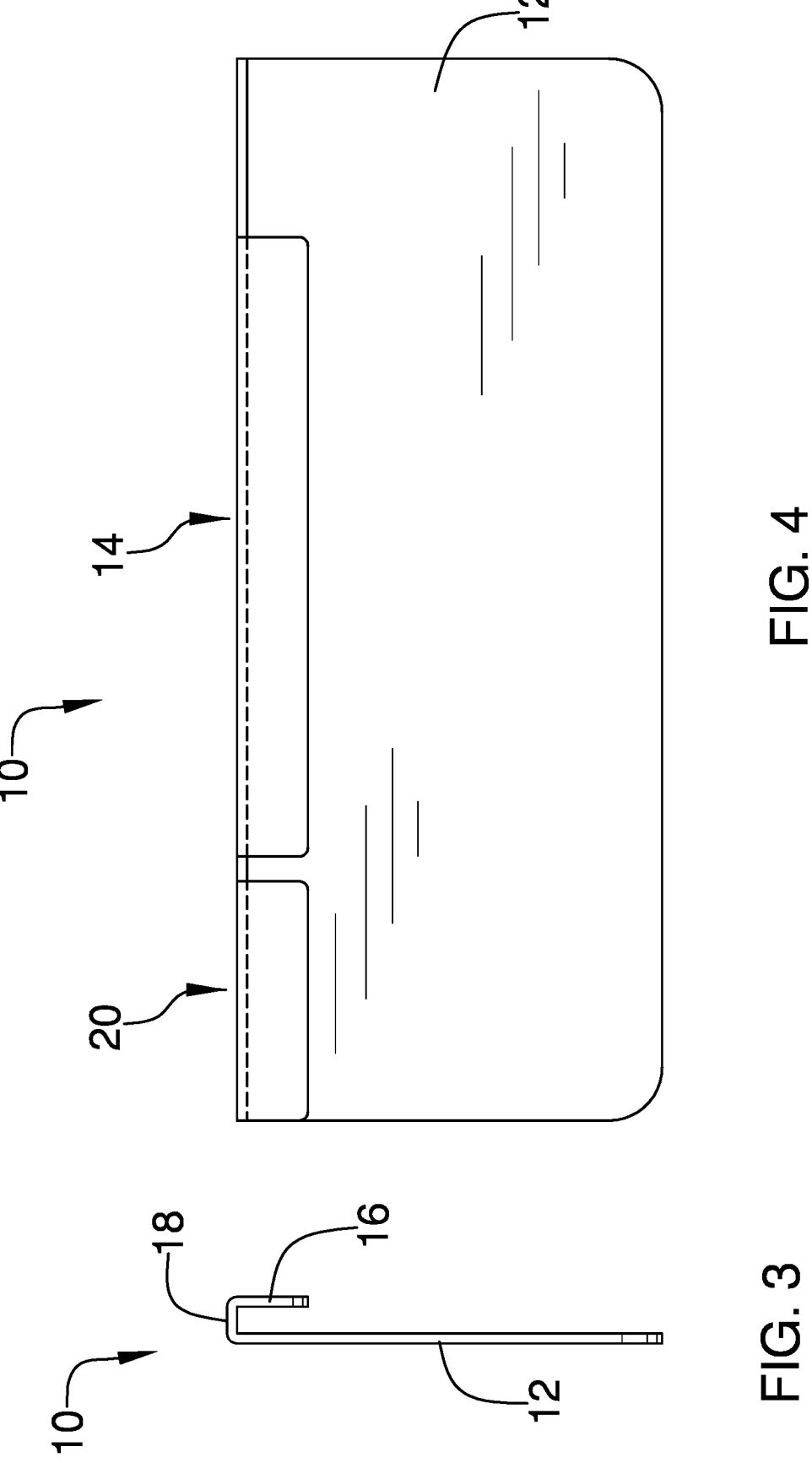
FIG. 3 is a side view of an embodiment of the disclosure.
FIG. 4 is a back view of an embodiment of the disclosure.
Figure 5:
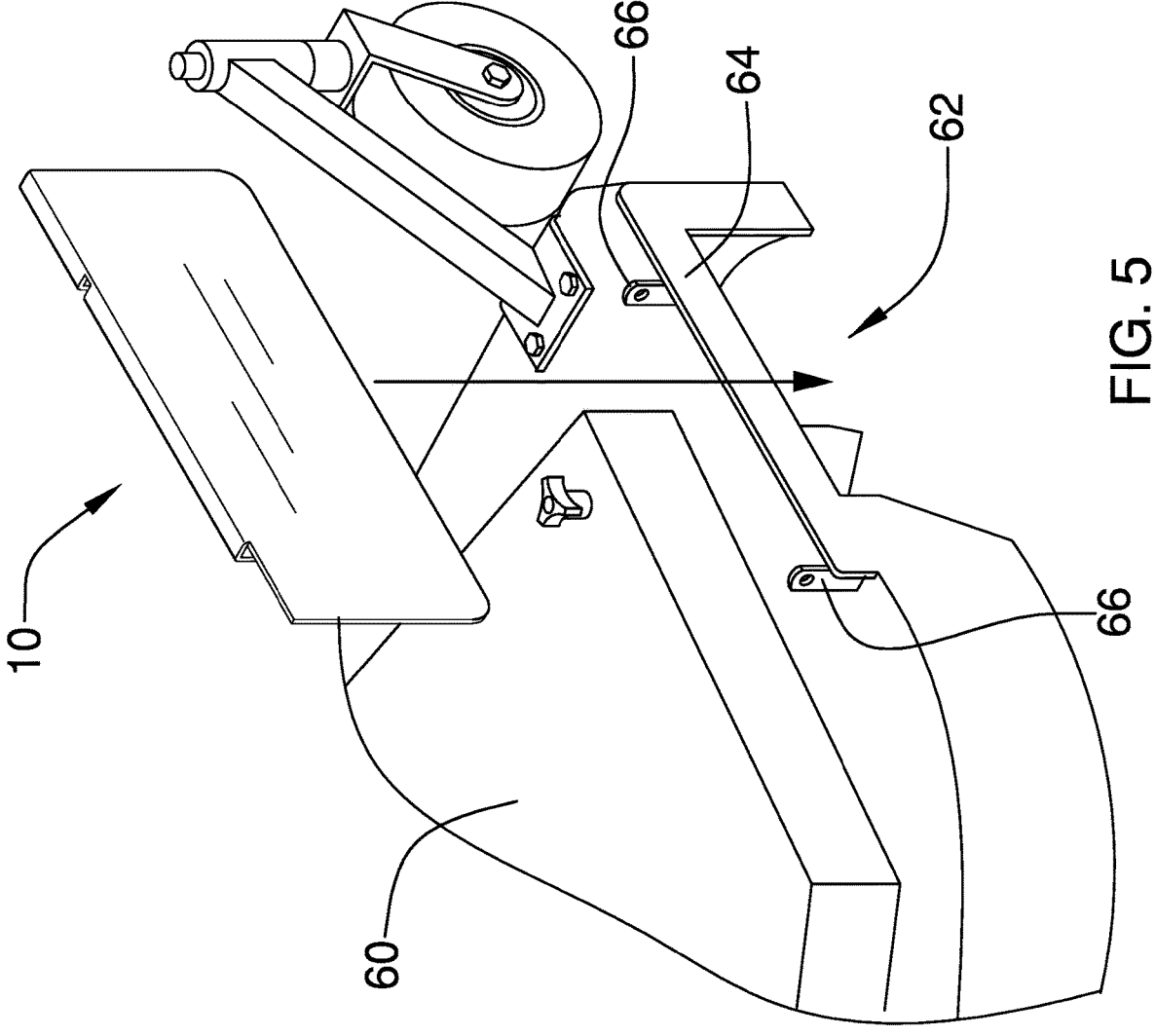
FIG. 5 is a front perspective view of an embodiment of the disclosure.
Figure 6:
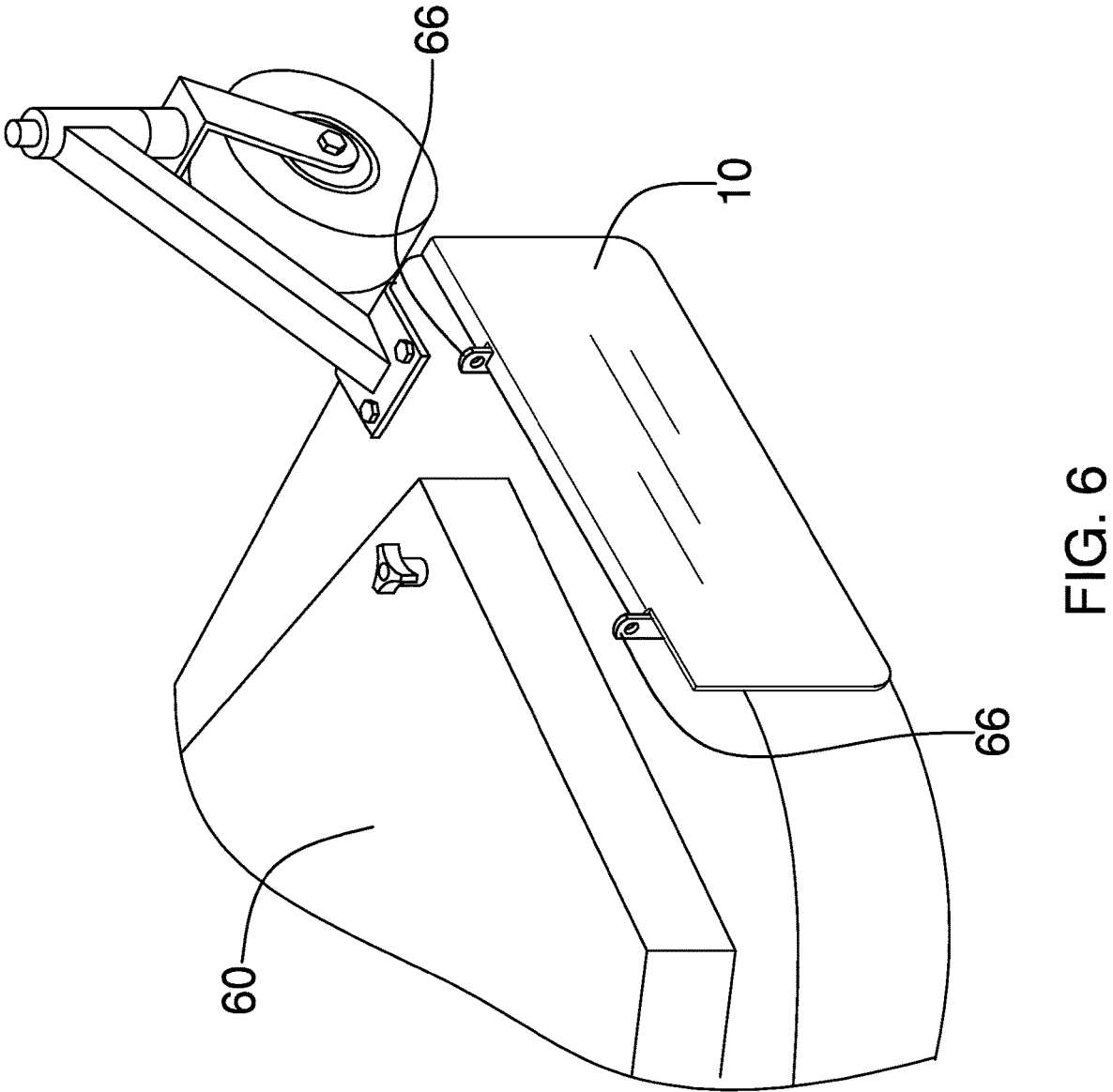
FIG. 6 is a front perspective view of an embodiment of the disclosure.

With reference now to the drawings, and in particular to FIGS. 1 through 8 thereof, a new commercial lawn mower outlet cover embodying the principles and concepts of an embodiment of the disclosure and generally designated by the reference numeral 10 will be described.

Figure 7:
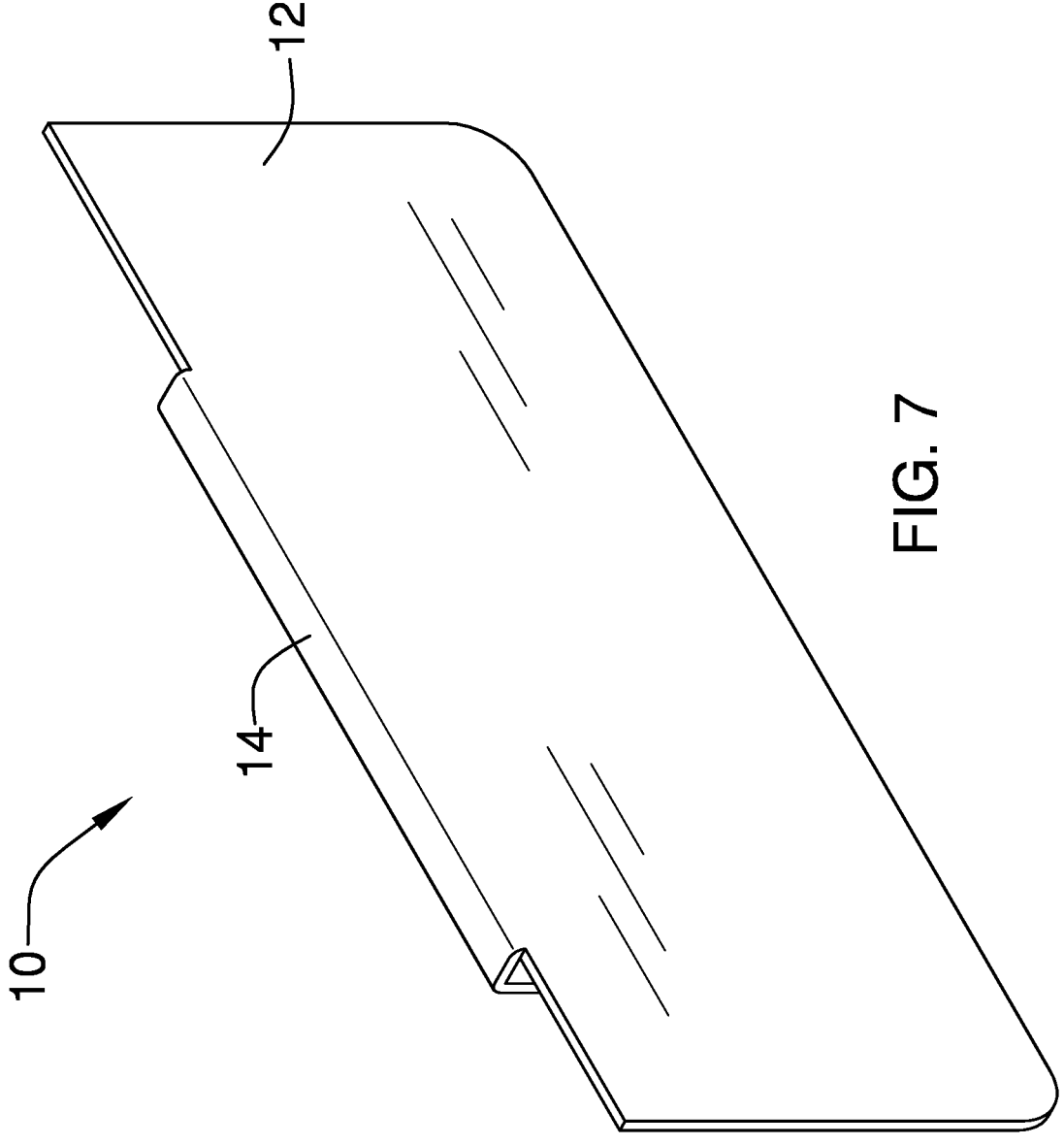
FIG. 7 is a front perspective view of another embodiment of the disclosure.
Figure 8:
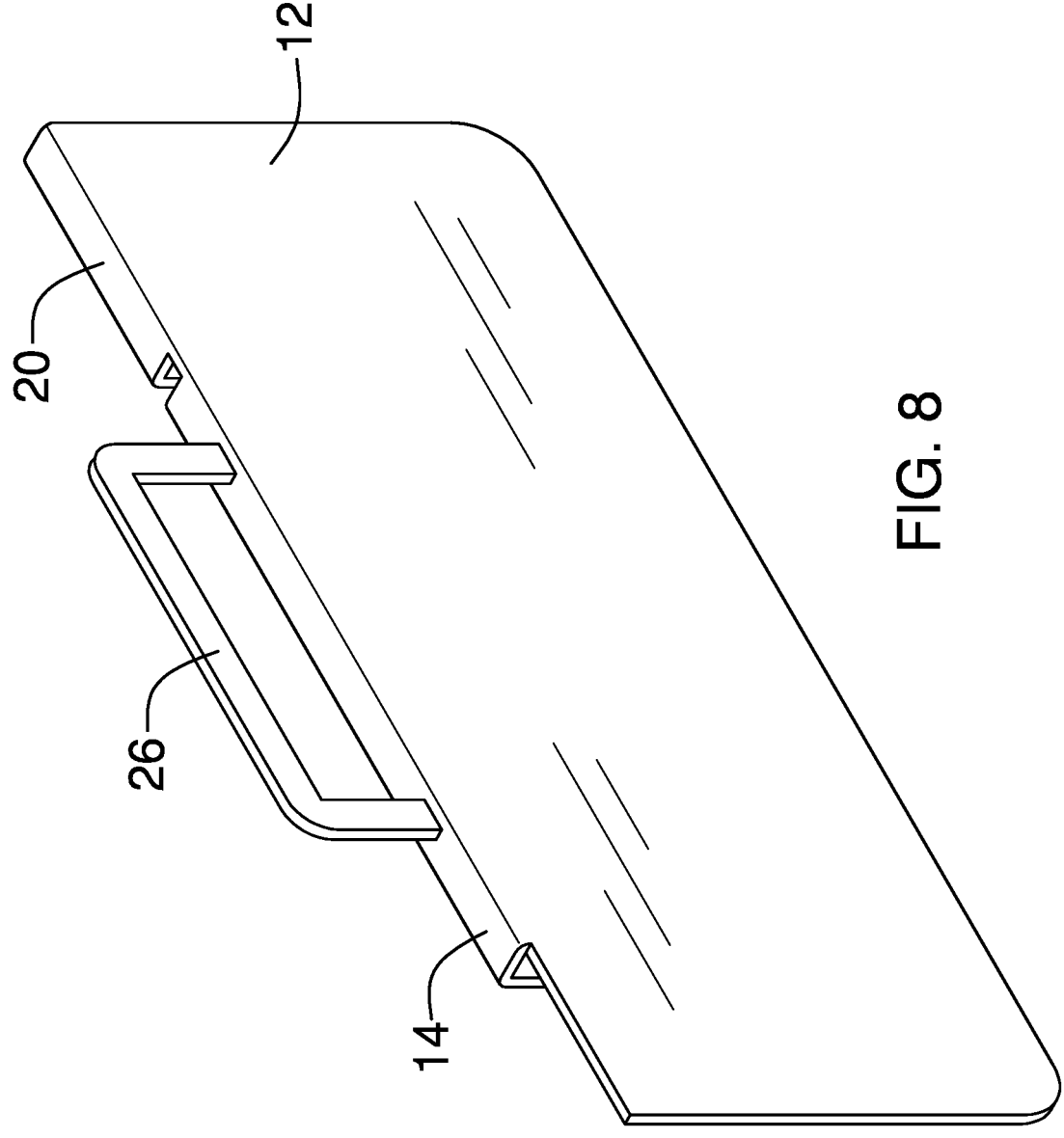
FIG. 8 is a front perspective view of another embodiment of the disclosure.

As best illustrated in FIGS. 1 through 8, the commercial lawn mower outlet cover 10 generally comprises a cover plate 12 and a first bracket structure 14. The cover plate 12 is rectangular and has a length and width sufficient to cover a grass outlet opening 62 in a deck of a commercial lawn mower 60. The first bracket structure 14 is designed to removably connect the cover plate 12 to a deck flange 64 positioned above the grass outlet opening 62 and projecting vertically from the deck of the commercial lawn mower 60. The first bracket structure 14 is L-shaped and includes a plate portion 16 having a height and a length sufficient to cover a substantial portion of the deck flange 64. The first bracket structure 14 includes a connecting leg 18 positioned essentially perpendicular to and to connect each of the cover plate 12. The connecting leg 18 has a width sufficient to space the cover plate 12 and the plate portion 16 apart from one another to create a receiving space sufficient to receive the deck flange 64 therein. The connecting leg 18 is designed and positioned to rest on a top edge of the deck flange 64 upon installation. The first bracket structure 14 has a length such that the sides of the first bracket structure 14 are positioned close or immediately adjacent to a pair of discharge chute mounting posts 66 behind the deck flange 64 and projecting vertically from the deck of the commercial lawn mower 60 such that the discharge chute mounting posts 66 resist sliding movement of the commercial lawn mower outlet cover 10 on the deck flange 64. The height of the first bracket structure 14 is sufficient to maintain engagement with the deck flange 64 upon unintentional slight or moderate vertical displacement of the commercial lawn mower outlet cover 10 by impact with outdoor objects or jostling due to vibrational forces. The first bracket structure 14 is designed and positioned to freely suspend the cover plate 12 from the deck flange 64 such that the cover plate 12 can be easily lowered or dropped downwardly into a blocking position to cover the grass outlet opening 62 to permit mulching of grass and/or leaves and can be easily lifted upwardly and off of the deck flange 64 to permit ejecting of cut grass and/or leaves out of the grass outlet opening 62. The commercial lawn mower outlet cover 10 further includes a second bracket structure 20 designed similar to the first bracket structure 14. The second bracket structure 20 is positioned adjacent and spaced apart from the first bracket structure 14 to form a guide slot 22 therebetween. The guide slot 22 is designed to be slid around one of the pair of discharge chute mounting posts 66 to guide and properly position the commercial lawn mower outlet cover 10 during installation and further resist sliding movement on the deck flange 64. FIG. 7 shows an alternative embodiment where the second bracket structure 20 is omitted.

In accordance with at least one possible embodiment, the cover plate 12 includes metal or heavy-duty plastic of sufficient weight to further resist unintentional vertical displacement of the cover plate 12. In accordance with at least one possible embodiment, the first bracket structure 14, the second bracket structure 20, and the cover plate 12 are integrally formed from a single metal piece. In accordance with at least one possible embodiment, the cover plate 12 includes rounded corners 24 at a lower portion thereof to minimize impacts with a ground surface or structure during a mowing procedure to further resist unintentional vertical displacement of the cover plate 12.

In accordance with at least one possible embodiment, the commercial lawn mower outlet cover 10 further includes a handle 26 (see FIG. 8) positioned to project from an upper portion of the cover plate 12 or the first bracket structure 14 to provide easy and safe lowering and lifting of the commercial lawn mower outlet cover 10.

In accordance with at least one possible embodiment, the commercial lawn mower outlet cover 10 permits a user to quickly cover and uncover a grass outlet opening 62 of a commercial lawn mower 60. To do so, the user first lowers the cover plate 12 and sliding the first bracket structure 14 onto a vertically-oriented deck flange 64 of the commercial lawn mower 60. The user proceeds to move the cover plate 12 into a blocking position to cover the grass outlet opening 62. The user then operates the commercial lawn mower 60 and cuts grass and/or leaves and then mulches cut grass and/or leaves within the deck. The user then lifts the cover plate 12 upwardly and off of the deck flange 64 and uncovers the grass outlet opening 62. The user can then operate the commercial lawn mower 60 and cut grass and/or leaves and then eject cut grass and/or leaves out through the grass outlet opening 62. In this manner, the user can repeat these steps as desired to easily and quickly switch between mulching and regular cutting.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A commercial lawn mower deck combined with an outlet cover for covering a grass outlet opening to permit mulching of grass and/or leaves; the outlet cover comprising:

a cover plate being rectangular and having a length and width sufficient to cover the grass outlet opening in the deck of a commercial lawn mower;

a bracket structure being configured to removably connect said cover plate to a deck flange positioned above the grass outlet opening and projecting vertically from the deck of the commercial lawn mower;

said bracket structure being L-shaped and comprising a plate portion having a height and a length sufficient to cover a substantial portion of the deck flange;

said bracket structure comprising a connecting leg disposed essentially perpendicular to both of said plate portion and said cover plate; and to connect both;

said connecting leg having a width sufficient to space said cover plate and said plate portion apart from one another to create a receiving space sufficient to receive the deck flange therein;

said connecting leg is configured and disposed to rest on a top edge of the deck flange upon installation;

said bracket structure having a length such that sides of said bracket structure are positioned close or immediately adjacent to a pair of discharge chute mounting posts behind the deck flange and projecting vertically from the deck of the commercial lawn mower such that the discharge chute mounting posts resist sliding movement of the commercial lawn mower outlet cover on the deck flange;

said height of said bracket structure being sufficient to maintain engagement with the deck flange upon unintentional slight or moderate vertical displacement of the commercial lawn mower outlet cover by impact with outdoor objects or jostling due to vibrational forces; and said bracket structure is configured and disposed to freely suspend said cover plate from the deck flange such that said cover plate is easily lowered or dropped downwardly into a blocking position to cover the grass outlet opening to permit mulching of grass and/or leaves and is easily lifted upwardly and off of the deck flange to permit ejecting of cut grass and/or leaves out of the grass outlet opening.

2. The commercial lawn mower outlet cover of claim 1, wherein:

said bracket structure comprises a first bracket structure;

the commercial lawn mower outlet cover further comprises a second bracket structure configured similar to said first bracket structure;

said second bracket structure is disposed adjacent and spaced apart from said first bracket structure to form a guide slot therebetween;

said guide slot is configured to be slid around one of the pair of discharge chute mounting posts to guide and properly position the commercial lawn mower outlet cover during installation and further resist sliding movement on the deck flange.

3. The commercial lawn mower outlet cover of claim 2, wherein said cover plate comprises metal or heavy-duty plastic of sufficient weight to further resist unintentional vertical displacement of said cover plate.

4. The commercial lawn mower outlet cover of claim 3, wherein said first bracket structure, said second bracket structure, and said cover plate are integrally formed from a single metal piece.

5. The commercial lawn mower outlet cover of claim 4, wherein said cover plate comprises rounded corners at a lower portion thereof to minimize impacts with a ground surface or structure during a mowing procedure to further resist unintentional vertical displacement of said cover plate.

6. The commercial lawn mower outlet cover of claim 5, further comprising a handle disposed to project from an upper portion of said cover plate or said first bracket structure to provide easy and safe lowering and lifting of the commercial lawn mower outlet cover.

7. The commercial lawn mower outlet cover of claim 2, wherein said first bracket structure, said second bracket structure, and said cover plate are integrally formed from a single metal piece.

8. The commercial lawn mower outlet cover of claim 1, wherein said bracket structure and said cover plate are integrally formed from a single metal piece.

9. The commercial lawn mower outlet cover of claim 1, further comprising a handle disposed to project from an upper portion of said cover plate or said bracket structure to provide easy and safe lowering and lifting of the commercial lawn mower outlet cover.

10. A method of quickly covering and uncovering a grass outlet opening of a commercial lawn mower using the combined commercial lawn mower deck and outlet cover of claim 1 comprising the steps of:

lowering said cover plate and sliding said bracket structure onto the vertically-oriented deck flange of the commercial lawn mower;

moving said cover plate into a blocking position to cover the grass outlet opening;

operating the commercial lawn mower and cutting grass and/or leaves and then mulching cut grass and/or leaves within the deck;

lifting said cover plate upwardly and off of the deck flange and uncovering the grass outlet opening;

operating the commercial lawn mower and cutting grass and/or leaves and then ejecting cut grass and/or leaves out through the grass outlet opening; and repeating the above steps as desired to perform mulching or ejecting of cut grass and/or leaves.

* * * * *